_United States Patent Office_ 3,007,946
Patented Nov. 7, 1961

3,007,946
**3-ALKOXY-16-METHYLENE-1,3,5(10)-
ESTRATRIEN-17-ONES**
David A. Tyner, Glenview, Ill., assignor to G. D. Searle
 & Co., Chicago, Ill., a corporation of Delaware
No Drawing. Filed Nov. 6, 1958, Ser. No. 772,175
2 Claims. (Cl. 260—397.4)

The present invention relates to a new intermediate, and more particularly to 3-alkoxy-16-methylene-1,3,5(10)-estratrien-17-ones of the structural formula

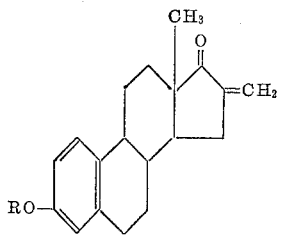

wherein R is a lower alkyl radical such as methyl, ethyl, propyl, butyl or hexyl.

The compounds of this invention are estrogens. They are also useful as chemical intermediates. They are particularly useful in the manufacture of 3-alkoxy-16-methyl-1,3,5(10)-estratrien-17-one by hydrogenation of the 16-methylene group in the presence of a suitable catalyst, such as palladium on charcoal. A preferred solvent is ethyl acetate. The 3-alkoxy-16-methyl-1,3,5(10)-estratrien-17-ones produced by this hydrogenation have valuable pharmacological properties. Especially, they are estrogenic agents and they also exhibit an ability to reduce the ratio of cholesterol to phospholipids in the serum.

Manufacture of the novel intermediate of this invention can be accomplished by heating a solution of the 3-methyl ether of estrone with paraformaldehyde and dimethylamine hydrochloride in a non-reacting organic solvent. Suitable inert solvents are the alkanols, preferably the higher boiling alkanols such as 3-methyl-1-butanol.

This invention and its use will appear more fully from the examples which follow, which are to be construed as illustrative only and not limiting the invention either in spirit or in scope. It will be apparent to those skilled in the art of organic synthesis that many modifications both of materials and methods may be practiced without departing from this invention. In these examples temperatures are given in degrees centigrade (° C.) and quantities of materials in parts by weight.

The present application is a continuation-in-part of my copending application, Serial No. 632,980, filed January 8, 1957, now U.S. Patent No. 2,949,476.

_Example 1_

A mixture of 50 parts of dimethylamine hydrochloride, 15 parts of paraformaldehyde and 28.5 parts of estrone methyl ether in 250 parts of 3-methyl-1-butanol is distilled until a distillate amounting to about 60 parts is collected, following which it is heated under reflux for 1 hour. Another portion of distillate amounting to about 100 parts is collected and discarded. The cooled reaction mixture is diluted with 100 parts of 10% hydrochloric acid and extracted with several portions of ether. The combined ethereal extracts are washed with water until neutral, dried over sodium sulfate, and evaporated to leave an oily residue. Upon crystallization from benzene there is obtained 3-methoxy-16-methylene-1,3,5(10)-estratrien-17-one, melting at about 129–132° C. The compound has a specific rotation in chloroform of about +113° C. and shows absorption in the ultraviolet at 224 millimicrons with an extinction coefficient of about 17,030.

_Example 2_

A solution of 0.9 part of 3-methoxy-16-methylene-1,3,5(10)-estratrien-17-one is dissolved in 36 parts of ethyl acetate and then shaken with 0.09 part of 5% palladium on charcoal catalyst. The catalyst is removed by filtration and the solution is evaporated to dryness. The residue is recrystallized from methanol to yield 3-methoxy-16-methyl-1,3,5(10)-estratrien-17-one melting at about 95–96° C. The compound shows a specific rotation in chloroform solution of +149°.

What is claimed is:
1. A compound of the structural formula

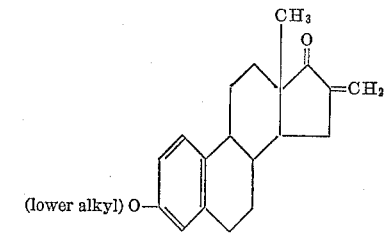

2. 3-methoxy-16-methylene-1,3,5(10)-estratrien-17-one.

References Cited in the file of this patent
UNITED STATES PATENTS
2,588,391    Julian et al. _____ Mar. 11, 1952